United States Patent [19]

Wagner

[11] Patent Number: 5,323,685
[45] Date of Patent: Jun. 28, 1994

[54] ACTUATING UNIT FOR A HYDRAULIC BRAKE SYSTEM FOR AUTOMOTIVE VEHICLES

[75] Inventor: Wilfried Wagner, Huettenberg-Weidenhausen, Fed. Rep. of Germany

[73] Assignee: Alfred Teves GmbH, Frankfurt, Fed. Rep. of Germany

[21] Appl. No.: 940,183

[22] Filed: Sep. 3, 1992

[30] Foreign Application Priority Data

Aug. 16, 1991 [DE] Fed. Rep. of Germany ....... 4127000

[51] Int. Cl.⁵ .............................. F15B 9/10
[52] U.S. Cl. .................. 91/376 R; 91/369.3; 91/375 R
[58] Field of Search ............... 91/369.1, 369.3, 376 R, 91/377, 375 R; 60/547.1, 553, 554, 556

[56] References Cited

U.S. PATENT DOCUMENTS

| | | | |
|---|---|---|---|
| 3,387,455 | 6/1968 | Eggstein | 60/553 |
| 4,587,885 | 5/1986 | Boehm et al. | 91/369.3 X |
| 4,633,757 | 1/1987 | Kubota | 60/547.1 X |
| 4,693,083 | 9/1987 | Reinartz | |
| 4,729,285 | 3/1988 | Harrison | 91/376 R X |
| 4,794,844 | 1/1989 | Taft | 91/376 R |
| 5,040,450 | 8/1991 | Jakobi | 91/376 R |

FOREIGN PATENT DOCUMENTS

| | | |
|---|---|---|
| 0140187 | 5/1985 | European Pat. Off. . |
| 3401402 | 7/1985 | Fed. Rep. of Germany . |
| 90/12715 | 11/1990 | PCT Int'l Appl. . |
| 2054777A | 2/1981 | United Kingdom . |

Primary Examiner—Edward K. Look
Assistant Examiner—John Ryznic
Attorney, Agent, or Firm—Robert P. Seitter; J. Gordon Lewis

[57] ABSTRACT

An actuating unit for a hydraulic brake system for automotive vehicles for shortening the actuating travel of the brake power booster to pre-charge the brake system. The actuating unit includes a master cylinder and a pneumatic brake power booster connected upstream thereof. A first sealing seat (10) of a control valve (9) of the brake power booster (1), which control valve is arranged in a control housing (8), is designed separately of the control housing (8) to be slidable within limits in relation thereto. The first sealing seat (10) is held on a stop (18) on the booster housing during a predefinable actuating stroke of the control housing (8) and, respectively, of a movable wall (5) generating the boosting force. After the required actuating travel of the brake power booster, the first sealing seat (10) is carried away from the stop (18) which causes a connection between the working chamber (7) and the vacuum chamber (6).

24 Claims, 2 Drawing Sheets

ACTUATING UNIT FOR A HYDRAULIC BRAKE SYSTEM FOR AUTOMOTIVE VEHICLES

FIELD OF THE INVENTION

The present invention relates to a hydraulic brake system for automotive vehicles comprised of a pneumatic brake power booster, preferably a vacuum brake power booster, and a master brake cylinder connected downstream of the pneumatic brake power booster. The brake power booster housing is subdivided into a vacuum chamber and a working chamber by a movable wall. A control valve is provided in a control housing which is actuatable by means of an input member. The first sealing seat of the control valve is in the control housing and the second sealing seat is on a valve piston cooperating with the input member. Both sealing seats cooperate with a valve member. Also included is a piston confining a pressure chamber in the master brake cylinder. This piston is of bipartite design and is composed of an external piston which is in force-transmitting connection with the movable wall, and of an internal piston which is sealedly guided in the external piston, and is displaceable within limits in relation to the external piston and is directly operable by the input member.

BACKGROUND OF THE INVENTION

A similar actuating unit is disclosed in German published patent application 34 01 402, which is the priority application for U.S. Pat. No. 4,693,083. This document discloses an actuating unit having a valve piston which actuates the control valve of the vacuum brake power booster and is coupled to the input member. The control housing accommodates the control valve, or a sleeve in operative connection with the control housing, and extends through a wall of the master brake cylinder in sealed relationship thereto. Upon actuation, these elements plunge with their ends remote from the input member into the pressure chamber of the master cylinder. In this system, on failure of the boosting force, the input member acts upon a piston having an effective cross-sectional surface which is smaller than that piston surface upon which the boosting force is acting. The arrangement of the component parts mentioned above is chosen such that the actuating travel of the control valve corresponds to the travel of the master cylinder piston so that in the event of pre-charging of the brake system (applying of brake shoes and/or supplying of a low braking pressure), a large pedal travel or actuating travel of the input member is required.

SUMMARY OF THE INVENTION

Therefore, it is an object of the present invention to provide an actuating unit of the kind initially referred to which permits a shortened actuating travel for pre-charging the brake system.

This object is achieved by the present invention in that the first sealing seat is arranged separate from the control housing to be slidable within limits in relation thereto and is kept on a stop on the booster housing during a predefinable actuating stroke, that is a predetermined actuating distance, of the control housing and of the movable wall, respectively.

An advantageous improvement of the present invention provides that the first sealing seat is designed on a sleeve which is guided slidably in the control housing and in sealed relationship thereto. The sleeve is biassed in the closing direction of the control valve and cooperates with a stop designed on the control housing, by which stop it is entrained after the predefinable actuating stroke.

The lost travel occurring on operation is effectively shortened in another improvement of the present invention in that a transverse member is arranged which confines the return movement of the valve piston and cooperates with the stop on the booster housing. The sleeve abuts axially on the transverse member.

Another embodiment of the inventive actuating unit provides that, in the release position, the transverse member abuts on a slide ring seal which seals the control housing in relation to the booster housing. This achieves an effective attenuation of the transverse member abutting on the brake power booster housing.

Another possibility of shortening the lost travel occurring on actuation resides in that the control housing is of bipartite design and is composed of a guide portion bearing against the booster housing and a front portion guided therein and carrying the movable wall. The portions are telescopically guided in each other, and sealed and slidable axially within limits relative to each other. The front portion takes support on the guide portion by means of a sleeve guided therein, and a compression spring.

Preferably, the two sealing seats bear against the valve member in the release position.

A major reduction of noises resulting, in particular, during the return movement of the control housing into its initial position is achieved in another embodiment of the invention. In this embodiment, the guide portion comprises a radial collar which abuts on a slide ring seal sealing the guide portion in relation to the booster housing, and the sleeve is furnished with a radially extending force-transmitting member which is in direct abutment on the collar.

According to another preferred embodiment of this invention, the valve piston comprises an axial extension extending into the interior of the external piston, and the internal piston abuts on a force-transmitting sleeve. The force-transmitting sleeve is arranged to be slidable within limits in the external piston and biassed by a spring supported on the external piston, and is arranged at an axial distance from the end of the extension. Any desired response characteristics and, respectively, the abrupt rise of the output force thereof can be realized by this embodiment of the invention.

BRIEF DESCRIPTION OF THE DRAWINGS

Further details and advantageous features of the present invention can be taken from the following description of two embodiments with reference to the accompanying drawings. In the drawings.

DETAILED DESCRIPTION OF THE DRAWINGS

Figure 1:
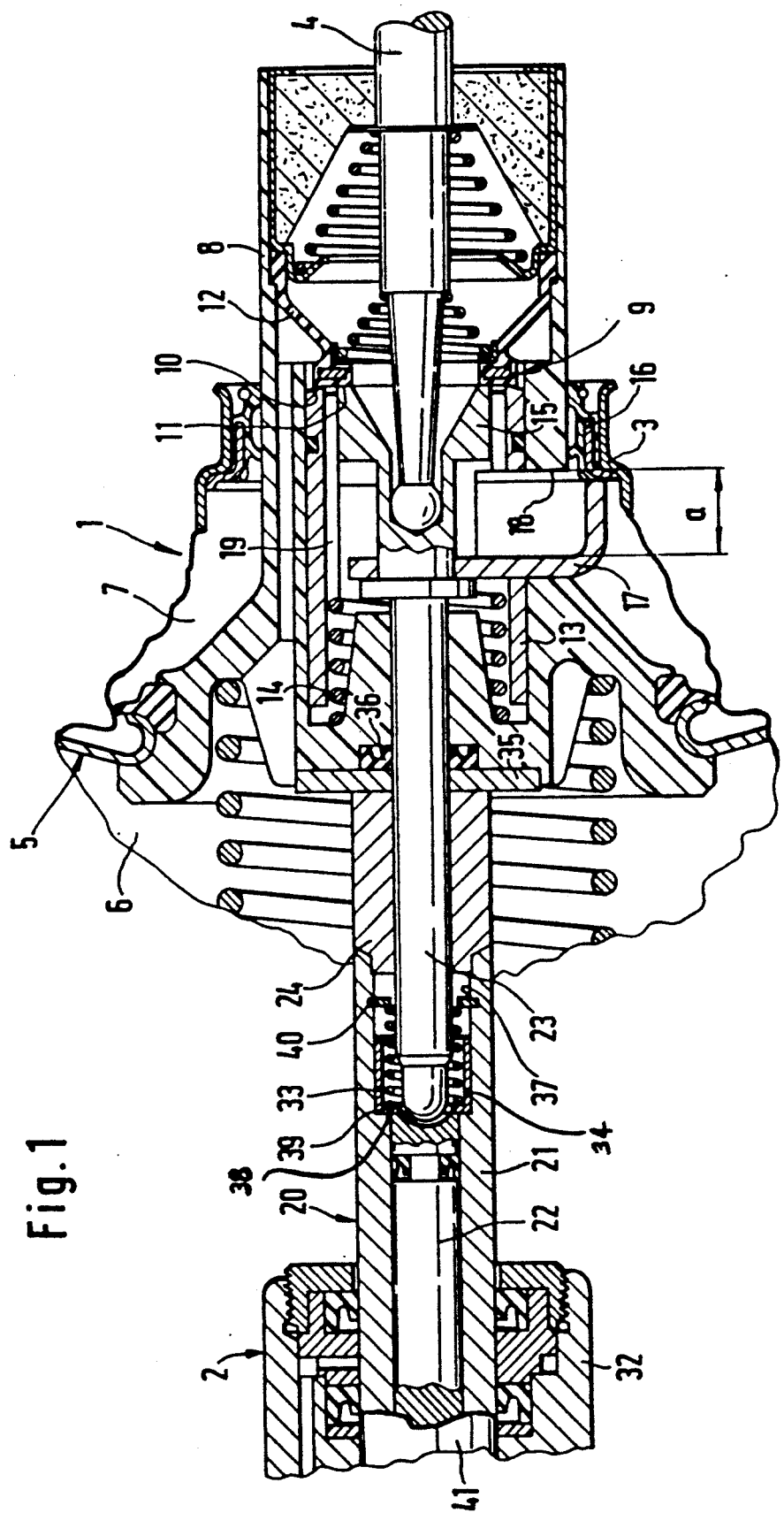
FIG. 1 is an axial cross sectional view of a first embodiment of the actuating unit of the present invention.

The inventive actuating unit shown in the drawing is composed of a vacuum brake power booster 1 as well as a master brake cylinder 2 connected downstream of the vacuum brake power booster 1. The master brake cylinder 2 includes a housing 32, which projects into the interior of a brake power booster housing 3 which is indicated schematically in the drawings. A control housing 8 is slidably guided in a slide ring seal 16 in the brake power booster housing 3 on the side opposite to the master cylinder 2. The control housing 8 accommodates a control valve 9 which is operable by means of an input member 4 coupled with a brake pedal (not shown). On its end remote from the input member 4, the control housing 8 carries a movable wall 5 which is formed by a diaphragm plate as well as by a rolling diaphragm abutting thereon. The movable wall subdivides the interior of the brake power booster housing 3 into an evacuatable vacuum chamber 6 and a working chamber 7.

The control valve 9 permits a connection between the working chamber 7 and the vacuum chamber 6 or the atmosphere. The control valve 9 is preferably composed of two annular sealing seats 10 and 11, which are arranged coaxially relative to each other and which cooperate with a rotation-symmetrical elastic valve member 12, e.g. a poppet valve. The two annular sealing seats 10 and 11 abut against the elastic valve member 12 in the release position of the vacuum brake power booster 1.

Opening of the first sealing seat 10, establishes a fluid connection in the fluid flow path extending between the two chambers 6, 7. The first sealing seat 10 is designed separately of the control housing 8, and is slidable within limits in relation to the control housing 8. The first sealing seat 10 is preferably located on a cylindrical sleeve 13, which is slidably guided in the control housing 8 in a sealed manner, and which is biassed by a compression spring 14 in the closing direction of the control valve 9.

Upon opening of the second sealing seat 11, the fluid flow path extending between working chamber 7 and atmosphere is opened, thereby ventilating working chamber 7 to atmosphere. The second sealing seat 11 is located on a valve piston 15 which is guided in the control housing 8 and is in force-transmitting connection with the input member 4. As shown in FIG. 1, the return movement of the valve piston is limited by a transverse member 17 which, in the release position, is in axial abutment on the slide ring seal 16. During actuation, the transverse member 17 cooperates with a stop 18 on the control housing 8, the function of which will be explained in more detail below. The sleeve 13 includes radial guide ribs 19, which permit a proper guidance of the valve piston 15 in the area of the sealing seats 10 and 11.

As shown by the drawing, a piston 20 confines a pressure chamber 41 in the master cylinder housing 32. The piston 20 is of bipartite design and is composed of an external or annular piston 21 of large diameter and of an internal piston 22 guided within the external piston 21. By means of a force-transmitting sleeve 24, the external piston 21 bears against a supporting plate 35 which axially abuts against the control housing 8 and which simultaneously prevents a displacement of a seal, e.g. a sealing cup 36, which seals the valve piston 15 in relation to the control housing 8. In this way, the boosting force generated by the movable wall 5 is transmitted onto the external piston 21.

At its end close to the force-transmitting sleeve 24, the external piston 21, guiding the internal piston 22, is provided with a cylindrical recess 37. The diameter of the cylindrical recess 37 is larger than the diameter of the internal piston 22. The recess 37 receives a second force-transmitting sleeve 34 which is provided with a radial annular surface 38, which abuts on the bottom of the recess 37 in the release position and which, on actuation, permits the internal piston 22 to be entrained by the external piston 21.

On its frontal end remote from the pressure chamber 41, the internal piston 22 is furnished with a spherical indentation 39. Initially, spherical indentation 39 is at a small distance from the end of an extension 23 of the valve piston 15 which extends into the interior of the external piston 21. Once the hydraulic pressure in the pressure chamber 41 reaches a predetermined amount, the internal piston 22 will be displaced in a direction opposite to the actuating direction. Thus, the end of the extension 23 and the internal piston 22 will move into contact. Simultaneously, the second force-transmitting sleeve 34 is displaced in the same direction in opposition to the effect of a spring 33 biassing it, the other end of the spring being supported on the external piston 21, preferably by means of a circlip 40. The fixed positioning of the spring 33 in the recess 37 allows exact adjustment of the abrupt rise in the output force of the response characteristics by variation of the spring length in the absence of applied force and, respectively, the spring rate of the spring 33.

In the embodiment of the invention according to FIG. 1, the input member 4 is displaced by a non-illustrated brake pedal in the actuating direction, which is to the left in the drawing. Then, the second valve seat 11, designed on the valve piston 15, will be opened so that the working chamber 7 is ventilated to the atmosphere creating a pressure differential between working chamber 7 and vacuum chamber 6. This pneumatic difference in pressure acts upon the movable wall 5 and causes advance movement of the booster unit 5, 8 in the actuating direction. During this booster unit movement, the sleeve 13 does not move, but takes support, under the effect of the compression spring 14, on the booster housing 3 through the transverse member 17 and the sealing ring 16.

As the external piston 21 is shifted into the pressure chamber 41 of the master brake cylinder 2, a reaction force results due to the hydraulic pressure developing in pressure chamber 41. This reaction force is transmitted onto the non-illustrated brake pedal via the internal piston 22, extension 23, the valve piston 15 and the input member 4. The compression spring 14 retains the sleeve 13 and thus the valve member in abutment with the poppet valve 12 until the sleeve 13 is carried away from the stop 18 on the control housing 8 by the transverse member 17. As a result, a defined pressure fluid volume is displaced into the brake system prior to further pedal movement. The pressure fluid volume increase is defined by the distance "a", the predetermined actuating distance, between the transverse member 17 and the stop 18 on the control housing 8.

Figure 2:
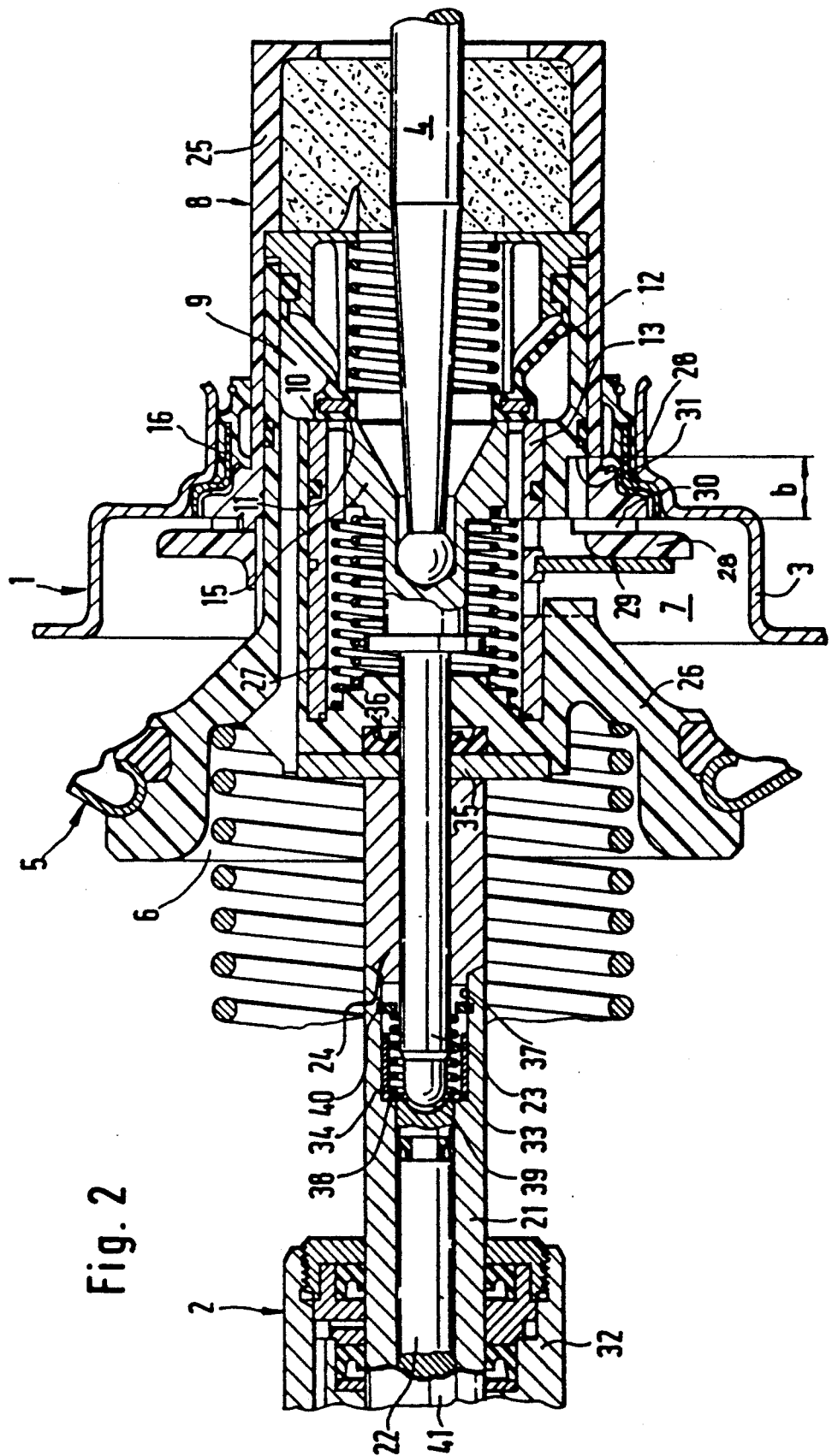
FIG. 2 is an axial cross sectional view of a second embodiment of the actuating unit of the present invention.

In the embodiment of the invention shown in FIG. 2, the control housing 8 is of bipartite design and is composed of a guide portion 25 of large diameter as well as of a front control housing portion 26. These portions are telescopically guided in each other. The guide portion 25 projects from the booster housing 3 and is guided in the slide ring seal 16 mentioned in the description of FIG. 1. The movable wall 5 is arranged on the control housing front portion 26. The two control housing portions 25 and 26, sealed in relation to each other, perform a relative movement, namely when the unit responds and when the unit has returned to its rear position. The control housing portions 25 and 26 do not move relative to one another during the remaining operation. The sleeve 13, which carries the first sealing seat 10 of the control valve 9, and which is slidably guided in the control housing front portion 26, is provided with a radially extending force-transmitting member 29. In the release position, radially extending force-transmitting member 29 takes support on a radial collar 28 shaped at the guide portion 25 and axially abutting on the slide ring seal 16. A compression spring 27, clamped between the sleeve 13 and the control housing front portion 26, simultaneously urges the two control housing parts 25, 26 apart. The limitation of the relative movement of the two control housing parts 25, 26 is performed by a stop portion 30 inserted into the guide portion 25 and placed at a distance "b" from a stop surface 31 designed on the front portion 26 in the release position.

When the control valve 9 is actuated in the sense of ventilating the working chamber 7 to the atmosphere, the control housing front portion 26 will advance towards the master brake cylinder 2, while the guide portion 25 comes to a standstill together with the sleeve 13 supported thereon under the effect of the compression spring 27. During the advance movement of the front portion 26, the brake system is pre-charged in the manner previously described, until the guide portion 25 with the sleeve 13 are entrained by the stop surface 31 engaging with the stop portion 30. Hence, the [pre-charging] pre-charging volume displaced into the brake system is defined by the distance "b" between the stop portion 30 and the stop surface 31 on the front portion 26.

LIST OF REFERENCE NUMERALS 1 brake power booster
2 master brake cylinder
3 brake power booster housing
4 input member
5 movable wall
6 vacuum chamber
7 working chamber
8 control housing
9 control valve
10 sealing seat
11 sealing seat
12 valve member
13 sleeve
14 compression spring
15 valve piston
16 slide ring seal
17 transverse member
18 stop
19 radial guide rib
20 piston
21 external piston
22 internal piston
23 extension
24 force-transmitting sleeve
25 guide portion
26 front portion
27 compression spring
28 radial collar
29 radially-extending force-transmitting member
30 stop portion
31 abutment surface
32 master brake cylinder housing
33 spring
34 force-transmitting sleeve
35 supporting plate
36 sealing cup
37 cylindrical recess
38 radial annular surface
39 spherical indentation
40 circlip
41 pressure chamber

I claim:

1. An actuating unit for a hydraulic brake system for automotive vehicles, said actuating unit comprising:
   a movable input member responsive to movement of a brake pedal;
   a brake power booster having a housing and a movable wall subdividing said housing into a vacuum chamber and a working chamber;
   a master brake cylinder having a pressure chamber and a piston responsive to movement of said input member and confining said pressure chamber;
   a control housing:
     (a) coupled to and movable with said movable wall of said brake power booster, and
     (b) coupled to said piston of said master brake cylinder for driving said piston into said pressure chamber of said master brake cylinder;
   a valve member; and
   a control valve through which:
     (a) a first fluid flow path extends between said vacuum chamber and said working chamber, and
     (b) a second fluid flow path extends between said working chamber and atmosphere,
   said control valve having:
     (a) first means forming a first valve seat in said first fluid flow path and responsive to movement of said control housing and:
       (i) abutting said valve member for closing said first fluid flow path as said control housing moves relative to said first valve seat over a predetermined actuating distance to prevent fluid flow between said vacuum chamber and said working chamber, and (ii) spaced from said valve member after said control housing has moved said predetermined actuating distance relative to said first valve seat for opening said first fluid flow path to permit fluid flow between said vacuum chamber and said working chamber, and
     (b) second means forming a second valve seat in said second fluid flow path and responsive to movement of said input member and:
       (i) abutting said valve member for closing said second fluid flow path before movement of said input member to prevent fluid flow between said working chamber and atmosphere, and (ii) spaced from said valve member after movement of said input member for opening said second fluid flow path to permit fluid flow between said working chamber and atmosphere.

2. An actuating unit in accordance with claim 1 wherein said first and said second sealing seats abut on said valve member in the brake release position.

3. An actuating unit in accordance with claim 1, wherein:
   said first means responsive to said control housing forming a first valve seat includes a sleeve which is in sliding and sealing engagement with said control housing;

said second means responsive to said input member forming a second valve seat include a valve piston disposed within said control housing and coupled to said input member; and said actuating unit further comprises means for biassing said sleeve to tend to close said control valve.

4. An actuating unit in accordance with claim 3 further comprising a stop, disposed on said control housing, for entraining said sleeve after said control housing has moved said predetermined actuating distance relative to said first valve seat.

5. An actuating unit in accordance with claim 4:
wherein said valve piston moves in a first direction in response to actuation of said brake pedal and undergoes return movement in the opposite direction in response to a pressure increase in said pressure chamber;
and further comprising:
a slide ring seal disposed between said control housing and said brake power booster housing for sealing said control housing to said brake power booster housing; and
a transverse member, for limiting said return movement of said valve piston, which abuts against said slide ring seal in the brake release position and against which said sleeve axially abuts and against which said stop engages after said control housing has moved said predetermined actuating distance.

6. An actuating unit in accordance with claim 3 wherein said control housing is of bipartite design and includes:
a guide portion bearing against said brake power booster housing and
a front portion, coupled to and movable with said movable wall, and guided within said guide portion and taking support on said guide portion by means of said sleeve,
wherein:
(a) said guide portion and said front portion are sealed and axially slidable within limits relative to each other and
(b) said actuating unit further comprises a compression spring clamped between said sleeve and said front portion for urging said guide portion away from said front portion.

7. An actuating unit in accordance with claim 6 further comprising:
a slide ring seal disposed between said guide portion and said booster housing for sealing said guide portion to said booster housing;
wherein:
(a) said guide portion comprises a radial collar axially abutting on said slide ring seal; and
(b) said sleeve includes a radially extending force-transmitting member which is in direct abutment with said collar.

8. An actuating unit in accordance with claim 6 further comprising:
a stop portion, arranged in said guide portion, for limiting the relative axial movement between said front portion and said guide portion by abutting against a stop surface of said front portion.

9. An actuating unit in accordance with claim 3 wherein said sleeve includes radial guide ribs for guiding movement of said valve piston in the area of said first and second sealing seats.

10. An actuating unit for a hydraulic brake system for automotive vehicles comprised of a pneumatic brake power booster, preferably a vacuum brake power booster, as well as a master brake cylinder connected downstream thereof in terms of effect, wherein the brake power booster housing is subdivided into a vacuum chamber and a working chamber by a movable wall, and wherein a control valve is provided in a control housing which is actuatable by means of an input member, a first sealing seat of said control valve being arranged in the control housing and a second sealing seat being arranged on a valve piston cooperating with the input member, and both sealing seats cooperating with a valve member, characterized in that a piston confining a pressure chamber in the master brake cylinder is of bipartite design and comprises an external piston which is in force-transmitting connection with the movable wall, and of an internal piston which is sealedly guided in the external piston, and is displaceable within limits in relation to the external piston and which is directly operable by the input member, and the first sealing seat is arranged separately of the control housing to be slidable within limits in relation thereto and is kept on a first stop on the booster housing during a predefinable actuating stroke of the control housing and of the movable wall, respectively.

11. An actuating unit as claimed in claim 10, characterized in that the first sealing seat is arranged on a sleeve which is guided slidably in the control housing in sealed relationship thereto, which is biassed in the closing direction of the control valve.

12. An actuating unit as claimed in claim 11, characterized in that the sleeve cooperates with a second stop arranged on the control housing, by which said second stop it is entrained after the predefinable actuating stroke.

13. An actuating unit as claimed in claim 12, characterized in that a transverse member is provided and confines the return movement of the valve piston and cooperates with the first stop on the booster housing, the sleeve abutting axially on the said transverse member.

14. An actuating unit as claimed in claim 13, characterized in that the transverse member is movable into engagement with the second stop.

15. An actuating unit as claimed in claim 14, characterized in that in a release position the transverse member abuts on a slide ring seal which seals the control housing in relation to the booster housing.

16. An actuating unit as claimed in claim 12, characterized in that the control housing is of bipartite design and is composed of a guide portion bearing against the booster housing as well as of a front portion guided therein and carrying the movable wall, the said portions being telescopically guided in each other, being sealed and slidable axially within limits relative to each other, the front portion taking support on the guide portion and the sleeve being guided within the front portion by the intermediary of a compression spring.

17. An actuating unit as claimed in claim 16, characterized in that the guide portion comprises a radial collar which abuts on a slide ring seal sealing the guide portion in relation to the booster housing, and in that the sleeve is furnished with a radially extending force-transmitted member which is in direct abutment on the collar.

18. An actuating unit as claimed in claim 16, characterized in that the axial movement of the two control housing portions is limited by a stop portion arranged in the guide portion and being movable into engagement with a stop surface arranged at an axial distance in the front portion.

19. An actuating unit as claimed in claim 18, characterized in that the sleeve comprises radial guide ribs which serve to guide the valve piston in the area of the sealing seats.

20. An actuating unit as claimed in claim 19, characterized in that the valve piston comprises an axial extension extending into the interior of the external piston, and in that the internal piston abuts on a force-transmitting sleeve, the latter being arranged to be slidable within limits in the external piston and being biassed by a spring supported on the external piston, and is placed at an axial distance from the end of the extension.

21. An actuating unit as claimed in claim 20, characterized in that the two sealing seats abut on the valve member in the release position of the brake power booster.

22. An actuating unit for shortening the actuating travel required of a brake power booster to pre-charge a hydraulic brake system for automotive vehicles, said actuating unit comprising:
   an input member responsive to movement of a brake pedal;
   a brake power booster having a housing and a movable wall subdividing said housing into a vacuum chamber and a working chamber;
   a master brake cylinder having a bipartite piston confining a pressure chamber, said bipartite piston including:
      (a) an annular, external piston, and
      (b) an internal piston, in sliding engagement with said external piston and responsive to movement of said input member; and
   a control housing;
      (a) coupled to and movable with said movable wall of said brake power booster, and
      (b) coupled to said external piston of said master brake cylinder for driving said external piston into said pressure chamber of said master brake cylinder;
   a valve member; and
   a control valve through which:
      (a) a first fluid flow path extends between said vacuum chamber and said working chamber extends, and
      (b) a second fluid flow path extending between said working chamber and atmosphere extends,
   said control valve having:
      (a) first means responsive to said control housing forming a first valve seat in said first fluid flow path: (i) abutting said valve member for closing said first fluid flow path as said control housing moves relative to said first valve seat over a predetermined actuating distance to prevent fluid flow between said vacuum chamber and said working chamber, and (ii) spaced from said valve member after said control housing has moved said predetermined actuating distance relative to said first valve seat for opening said first fluid flow path to permit fluid flow between said vacuum chamber and said working chamber, and
      (b) second means responsive to said input member forming a second valve seat in said second fluid flow path: (i) abutting said valve member for closing said second fluid flow path before movement of said input member to prevent fluid flow between said working chamber and atmosphere, and (ii) spaced from said valve member after movement of said input member for opening said second fluid flow path to permit fluid flow between said working chamber and atmosphere.

23. An actuating unit in accordance with claim 22:
   wherein said second means responsive to said input member forming a second valve seat include a valve piston disposed within said control housing and coupled to said input member;
   and further comprising:
   an axial extension extending from said valve piston into the interior of said external piston;
   a force-transmitting sleeve, slidable within limits in said external piston, abutting against said internal piston and disposed at an axial distance from the end of said axial extension; and
   a spring supported on said external piston for biassing said force-transmitting sleeve towards said external piston.

24. An actuating unit in accordance with claim 22 wherein said first and said second sealing seats abut on said valve member in the brake release position.

* * * * *